United States Patent Office 2,935,514
Patented May 3, 1960

2,935,514

BENZIMIDAZOLES

Karl Hoffmann, Binningen, and Alfred Hunger, Jindrich Kebrle, and Alberto Rossi, Basel, Switzerland, assignors to Ciba Pharmaceutical Products Inc., Summit, N.J.

No Drawing. Application September 19, 1957
Serial No. 684,860

Claims priority, application Switzerland
September 28, 1956

12 Claims. (Cl. 260—309.2)

This invention provides as new compounds 1-(lower-tertiary-amino lower-alkyl)-benzimidazoles which contain in the 2-position a benzyl residue and in the 5-position a nitro group, and salts of these compounds. The invention provides more especially benzimidazoles of the formula

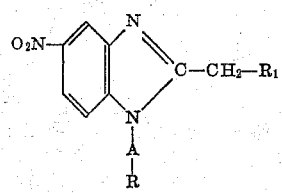

in which A represents a lower alkylene residue, especially the ethylene residue, and R represents an alkylene-imino group if desired interrupted by a hetero atom, such as a piperidino, pyrrolidino or morpholino group, and more especially a di-lower alkylamino group, above all the diethylamino group, and in which $R_1$ represents an unsubstituted phenyl residue or a phenyl residue substituted in 3-and/or 4-position, but especially in 4-position by halogen or a lower alkyl or a lower alkoxy group, and salts of these compounds.

The new compounds have good analgesic properties and show better pharmacological properties than comparable benzylbenzimidazoles and can therefore be used as medicaments. Of special interest owing to their analgesic properties are compounds of the formula

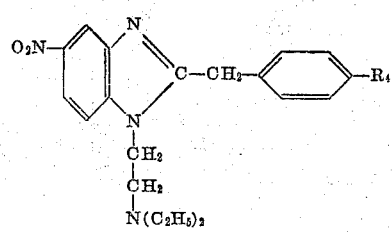

in which $R_4$ represents a hydrogen, chlorine or lower alkyl group and above all 1-(β-diethylaminoethyl)-2-benzyl-5-nitro-benzimidazole, 1-(β - diethylaminoethyl) - 2 - (para-chlorobenzyl) - 5 - nitro - benzimidazole and 1-(β-diethylaminoethyl)-2-(para-methylbenzyl)-5-nitro-benzimidazole and salts of these compounds.

Compounds of the above formula which are outstanding in their effect are those in which $R_4$ is a lower alkoxy group, such as 1-(β-diethylamino-ethyl)-2-(para-methoxy - benzyl)-5-nitro-benzimidazole, and preferably 1-(β-diethylamino-ethyl)-2-(para-ethoxy-benzyl)-5 -nitro-benzimidazole. These compounds are in addition very good muscle relaxants.

The new benzimidazoles are made in accordance with the process of this invention by methods in themselves known. One method consists, for example, in introducing a lower tertiary amino lower alkyl residue directly or in stages into the 1-position of a 5-nitro-2-benzyl-benzimidazole. Thus, a 5-nitro-2-benzyl-benzimidazole may be reacted with a reactive ester of an alcohol of the formula

in which A has the meaning given above, and R' represents a lower tertiary amino group or a residue convertible into a tertiary amino group, for example, a hydroxyl group, and in a compound so obtained containing a residue convertible into a lower tertiary amino group the latter residue is so converted, a hydroxyl group, for example, being so converted by chlorination followed by reaction with a secondary amine. Suitable reactive esters are more especially those of strong inorganic or organic acids, such as hydrohalic acids or organic sulfonic acids, such as para-toluene sulfonic acid. The introduction of the tertiary aminoalkyl residue is advantageously carried out in the presence of a condensing agent, especially one which is capable of forming a metal salt with the 5-nitro-2-benzyl-benzimidazole, such as an alkali metal or alkaline earth metal, for example, sodium, lithium or calcium, or amides, hydrides, hydrocarbon compounds, alcoholates, oxides or hydroxides of such metals, for example, sodamide, sodium hydride, lithium-butyl, potassium-phenyl, lithium-phenyl, potassium tertiary butylate, potassium tertiary amylate sodium ethylate, sodium oxide or sodium hydroxide, or with the use of the preformed metal salt of the benzimidazole. In this reaction a mixture of 5- and 6-nitro derivatives is usually obtained which can be separated for example by crystallizing the bases or their salts.

Another method of making the new compounds consists in forming the benzimidazole ring substituted in the 2-position by a benzyl group and in the 5-position by a nitro group by subjecting to ring closure a 2-(R''—NH)-5-nitroaniline or a correspondingly N-substituted derivative thereof, in which R'' represents the above-mentioned R—A—group or a residue convertible into such group, for example, a halogen-alkyl group. The residue convertible into an R—A—group is then so converted, in the case of the halogen-alkyl group, for example, by reaction with a secondary amine. Thus for example, a 2 - (tertiary aminoalkylamino) - 5 - nitroaniline may be subjected to ring closure directly or in a stage with a phenylacetic acid or a reactive functional derivative thereof, especially an ester thereof with an easily removable alcohol residue or an imino-ether. For the preparation of the end products it is also possible to carry out the condensation with a phenyl-acetic aldehyde or a functional derivative thereof instead of with a phenyl-acetic acid, and to oxidize the product formed. In the above-mentioned reactions the starting materials can also be formed under the reaction condition. Thus, for example, a 2-halogen-5-nitro-phenyl-acetyl-aniline may be subjected to ring closure with a tertiary aminoalkylamine to form the corresponding benzimidazole derivative.

The reactions of the present process may be carried out in the absence or presence of a diluent and/or a condensing agent, when necessary at a raised temperature or under atmospheric or superatmospheric pressure.

In the products of the process substituents in the benzyl residue can be replaced by other groups, for instance a hydroxyl group can be converted into an etherified or esterified hydroxyl group, a lower alkoxy group or a nitro group into an amino group and the latter into a lower alkoxy group or a halogen atom.

Depending on the procedure used the new compounds are obtained in the form of the free bases or their salts. From the salts the free bases may be obtained by methods in themselves known. From the bases salts can be obtained by reaction with acids, which are suitable for the formation of therapeutically useful salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, oxyethane sulfonic acid, benzene or toluene sulfonic acid or a therapeutically active acid.

The starting materials are known or can be made by methods in themselves known.

The invention includes any modification of the process in which there is used as starting material an intermediate product of any stage of the process, and the remaining steps are carried out.

The new compounds are useful as medicaments, for example, in the form of pharmaceutical preparations which contain the compound or a salt thereof in admixture with a pharmaceutical organic or inorganic solid or liquid carrier suitable for enteral, parenteral or topical administration. For making the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other known carriers for medicaments. The pharmaceutical preparations may be in the form, for example, of tablets, dragees, salves or creams or in liquid form as solutions, suspensions or emulsions. If desired, they may be sterilized and/or may contain auxiliary substances, such as preserving, emulsifying, wetter agents, salts for regulating the osmotic pressure or buffers. They may also contain other therapeutically useful substances.

The following examples illustrate the invention:

EXAMPLE 1

5.04 grams of 2-($\beta$-diethylamino-ethylamino)-5-nitro-aniline are added to an imino-ether hydrochloride solution prepared from 4.7 grams of benzyl cyanide and 2.3 cc. of ethanol, disolved in 50 cc. of chloroform, by saturation with dry hydrochloric acid gas at $-10°$ C. in the usual manner. The whole is then stirred first for 2 hours at 25° C. and then for 20 hours under reflux. The reaction mixture is extracted with aqueous hydrochloric acid, the extracts are washed with chloroform and rendered alkaline with ammonia solution and extracted with chloroform, and the chloroform extract is washed with sodium carbonate solution, dried with magnesium sulfate, and evaporated. Crystallization of the residue from ether yields 1-($\beta$-diethylaminoethyl)-2-benzyl-5-nitro-benzimidazole of the formula

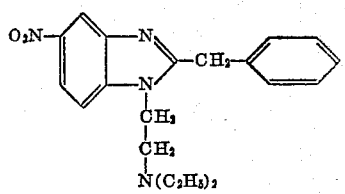

in the form of colorless crystals melting at 87–89° C. The hydrochloride, obtained by mixing an ethanolic solution of the base with one equivalent of ethanolic hydrochloric acid, concentrating the mixture by evaporation, and crystallizing by the addition of a small amount of water, melts at 199–201° C.

EXAMPLE 2

5.8 grams of 2-chloro-5-nitro-phenylacetyl-aniline, 10 cc. of $\beta$-diethylamino-ethylamine and 0.1 gram of copper powder are heated in an atmosphere of nitrogen for 4 hours at 150° C. The reaction mixture is taken up in dilute hydrochloric acid, the acid solution is extracted with ether and then rendered alkaline with ammonia solution and extracted with chloroform. After being washed with sodium carbonate solution and dried with magnesium sulfate, the chloroform extract is evaporated. Crystallization of the residue from ether yields 1-($\beta$-di- ethylaminoethyl)-2-benzyl-5-nitro-benzimidazole melting at 87–89° C. and described in Example 1.

The 2-chloro-5-nitro-phenylacetyl-aniline used as starting material can be obtained as follows:

8.6 grams of 2-chloro-5-nitraniline are boiled in 100 cc. of toluene with 10 grams of phenyl-acetyl chloride for 2 hours under reflux, the reaction mixture is concentrated by evaporation, and the precipitated 2-chloro-5-nitro-phenylacetyl-aniline melting at 192–193° C. is filtered off.

EXAMPLE 3

5.04 grams of 2-($\beta$-diethylamino-ethylamino)-5-nitro-aniline are added to an imino-ether hydrochloride solution prepared from 5.65 grams of para-chlorobenzyl cyanide and 2.3 cc. of ethanol dissolved in 50 cc. of chloroform by saturation with dry hydrochloric acid gas at $-10°$ C. The whole is then stirred first for 2 hours at 25° C. and then for 20 hours under reflux. The reaction mixture is extracted with aqueous hydrochloric acid, the extract is washed with chloroform and rendered alkaline with ammonia solution, then extracted with chloroform, the chloroform extract washed with sodium carbonate, dried with magnesium sulfate, and evaporated. Crystallization of the residue from a mixture of ether and pentane yields 1-($\beta$-diethylaminoethyl)-2-(parachlorobenzyl)-5-nitro-benzimidazole in the form of pale yellow lamellae melting at 75–76° C. The crystalline hydrochloride obtained by mixing an ethanolic solution of the base with one equivalent of hydrochloric acid in ethanol, melts at 238–240° C. The methane sulfonate prepared in an analogous manner melts at 163–166° C.

EXAMPLE 4

7.2 grams of 2-($\beta$-diethylamino-ethylamino)-5-nitroaniline hydrochloride in 90 ml. of glacial acetic acid are added at room temperature to the imino ether hydrochloride of meta-methoxy-phenyl-acetic acid, which is obtained from 7.3 grams of meta-methoxy-benzyl-cyanide and 2.9 ml. of absolute alcohol in 50 ml. of chloroform by introducing dry hydrochlorid acid gas at $-10°$ C. and allowing the mixture to stand for 16 hours at 25° C. and evaporating under reduced pressure. The whole is stirred for 20 hours at 40–45° C. The reaction mixture is evaporated, the residue taken up in aqueous hydrochloric acid, the acid solution washed with chloroform and rendered alkaline with ammonia solution, extracted with chloroform, and the chloroform extract washed with sodium carbonate solution and dried with magnesium sulfate and evaporated. The resulting crude 1-($\beta$-diethylamino-ethyl)-2-(meta-methoxy-benzyl) - 5 - nitro - benzimidazole can be converted by being dissolved in ethanol and by the addition of an equivalent of ethanolic hydrochloric acid into the colourless, crystalline hydrochloride which melts at 186–188° C.

EXAMPLE 5

7.2 grams of 2-($\beta$-diethylamino-ethylamino)-5-nitroaniline hydrochloride in 90 ml. of glacial acetic acid are added at room temperature to the imino-ether hydrochloride of 3:4-dimethoxy-phenylacetic acid, which is obtained from 8.85 grams of 3:4-dimethoxy-benzylcyanide and 2.9 ml. of absolute ethanol in 50 ml. of chloroform by introducing dry hydrochloric acid gas at $-10°$ C., allowing the whole to stand for 16 hours at 25° C. and evaporating under reduced pressure. The whole is then stirred for 20 hours at 40–45° C. The reaction mixture is evaporated at reduced pressure, the residue is taken up in aqueous hydrochloric acid, the acid solution is washed with chloroform and rendered alkaline with ammonia solution, extracted with chloroform and the chloroform extract is washed with sodium carbonate solution, dried with magnesium sulfate and evaporated. The so-obtained, crude 1-($\beta$-diethylamino-ethyl)-2-(3':4'-dimethoxy-benzyl)-5-nitro-benzimidazole can be converted into the pale yellow crystalline hydrochloride melting at 192–194° C., by dissolution in ethanol and the addition of the calculated quantity of ethanolic hydrochloric acid.

EXAMPLE 6

A solution of 68 grams of sodium ethylate in ethanol, as concentrated as possible, is added dropwise to 253 grams of 2-benzyl-5-nitro-benzimidazole in 3.0 liters of dioxane at 60° C. with stirring. After the addition is complete, the sodium salt of 2-benzyl-5-nitro-benzimidazole, which has crystallized in the form of fine yellow needles, is suction-filtered and dried in vacuo at 60° C. To 27.6 grams of this sodium salt suspended in 600 ml. of absolute dioxane there are added dropwise 13.5 grams of β-diethylamino-ethyl chloride at 60° C. Stirring is carried on for an hour at 60° C., the sodium chloride formed is filtered off, and the filtrate is evaporated. The resulting mixture of 1-(β-diethylamino-ethyl)-2-benzyl-6-nitro-benzimidazole and 1-(β-diethylamino-ethyl)-2-benzyl-5-nitro-benzimidazole is separated into its two isomers in the following manner:

After crystallizing the product twice from ether there is obtained pure 1-(β-diethylamino-ethyl)-2-benzyl-6-nitro-benzimidazole melting at 96–97° C. The mother liquor is evaporated and in ethanol the calculated quantity of ethanolic hydrochloric acid is added. The precipitated hydrochloride, after being repeatedly recrystallized from water, gives pure 1-(β-diethylamino-ethyl)-2-benzyl-5-nitro-benzimidazole hydrochloride melting at 199–201° C. Instead of the sodium ethylate solution there can be used a solution of sodamide in liquid ammonia (prepared from 200 ml. of ammonia, 2.3 grams of sodium and 0.06 gram of ferric nitrate) for the condensation.

By suitable choice of the solvent and the reaction temperature for the condensation the proportion of the isomers obtained can be regulated:

| Solvent | Temperature, ° C. | 5-nitro-derivative in percent | 6-nitro-derivative in percent |
| --- | --- | --- | --- |
| Ethanol-water (1:4) | 60 | 50 | 50 |
| Ethanol | 60 | 50 | 50 |
| Dioxane | 25 | 19 | 81 |
| Do | 60 | 25 | 75 |
| Do | 100 | 26 | 74 |
| Carbon tetrachloride | 60 | 65 | 35 |
| Benzene | 60 | 51 | 49 |

The 2-benzyl-5-nitro-benzimidazole used as starting material for the preparation of the above described compounds can be obtained as follows:

A solution of 17.5 grams of benzyl-cyanide and 8.7 grams of ethanol is saturated with dry hydrogen chloride while stirring and cooling with ice water; the mixture is allowed to stand for 12 hours at room temperature and then stirred with a suspension of 15.3 grams of 2-amino-4-nitroaniline in 200 ml. of dioxane. The reaction mixture is stirred for 24 hours at about 85° C., then boiled under reflux for four hours and finally, when still hot, rendered sharply acid with a mixture of ethyl acetate and hydrochloric acid. The hydrochloride of 2-benzyl-5-nitro-benzimidazole which crystallizes out is purified by recrystallization from dilute aqueous hydrochloric acid with the aid of animal charcoal. By adding aqueous ammonia, the free base is obtained which after recrystallization from a mixture of dioxane and ligroin melts at 189° C.

EXAMPLE 7

9 grams of diethylamino-ethyl chloride in 10 ml. of dioxane are added dropwise at 70° C. to a stirred solution of 9.6 grams of 2-(para-chlorobenzyl)-5-nitrobenzimidazole in 65 ml. of 1 N-caustic soda solution. The mixture is stirred for one hour at room temperature, the precipitated oil is taken up in ethyl acetate, the ethyl acetate solution is extracted with dilute hydrochloric acid, the acid solution is rendered alkaline with caustic soda solution and extracted again with ethyl acetate. The ethyl acetate extract is washed with water and dried with anhydrous potassium carbonate and evaporated. It gives 9 grams of a mixture of 1-(β-diethylamino-ethyl)-2-(parachlorobenzyl)-5-nitro-benzimidazole and 1-(β-diethylamino-ethyl)-2-(para-chlorobenzyl)-6-nitro benzimidazole.

This mixture is separated into its two components as follows:

The mixture is taken up in alcohol and is mixed with the calculated quantity of hydrochloric acid in ethyl acetate and inoculated with the hydrochloride of the 5-nitro derivative. After suction-filtering and recrystallizing the resulting precipitate from ethanol, there is obtained 4.2 grams of pure 1-(β-diethylamino-ethyl)-2-(para-chlorobenzyl)-5-nitro-benzimidazole hydrochloride melting at 238–240° C.

The mother liquor is evaporated, taken up in water, rendered alkaline with caustic soda solution, extracted with ethyl acetate, and the extract is washed with water and dried with anhydrous potassium carbonate and then evaporated. By crystallizing the residue from a mixture of ether and petroleum ether with inoculation with the 6-nitro derivative, pure 1-(β-diethylamino-ethyl)-2-(para-chlorobenzyl)-6-nitro-benzimidazole melting at 96–98° C. is obtained.

The 2-para-chlorobenzyl-5-nitro-benzimidazole used as starting material can be prepared as follows:

Dry gaseous hydrochloric acid is introduced into a molten mixture of 28.2 grams of para-chlorobenzyl cyanide and 11.6 ml. of absolute ethanol at 15–25° C. until the latter is saturated. After allowing the reaction mixture to stand for 12 hours at 20° C. the crude iminoether hydrochloride is taken up in 200 ml. of absolute dioxane and stirred with 15.2 grams of 2-amino-4-nitroaniline for 2 hours at room temperature, then under reflux for 14 hours. From the still hot solution the hydrochloride of 2-(para-chlorobenzyl)-5-nitrobenzimidazole precipitated by adding ethyl acetate saturated with hydrochloric acid and then filtered immediately. The free base is liberated from the hydrochloride by boiling with aqueous ammonia solution, filtered and recrystallized from ethyl acetate. The resulting 2-(para-chlorobenzyl)-5-nitrobenzimidazole melts at 175–176° C.

EXAMPLE 8

7.2 grams of 2-(β-diethylamino-ethylamino)-5-nitroaniline hydrochloride in 90 ml. of glacial acetic acid are added at room temperature to the imino-ether hydrochloride of para-methoxy-phenylacetic acid, which is prepared from 7.3 grams of para-methoxy-benzyl cyanide and 2.9 ml. of absolute ethanol in 50 ml. of chloroform by introducing dry hydrochloric acid gas at −10° C., letting the mixture stand for 16 hours at 25° C. and evaporating under reduced pressure. The whole is stirred for 20 hours at 40–45° C. The reaction mixture is evaporated under reduced pressure, the residue is taken up in aqueous hydrochloric acid, the acid solution is washed with chloroform and rendered alkaline with ammonia solution, extracted with chloroform and the chloroform extract washed with sodium carbonate solution and dried with magnesium sulfate and evaporated. The so-obtained crude 1-(β-diethylaminoethyl)-2-(para-methoxy-benzyl)-5-nitro-benzimidazole can be converted into its colourless crystalline hydrochloride melting at 197–198° C. by dissolving it in ethanol and adding the calculated quantity of ethanolic hydrochloric acid.

EXAMPLE 9

7.2 grams of 2-(β-diethylamino-ethylamino)-5-nitroaniline hydrochloride in 90 ml. of glacial acetic acid are added at room temperature to the imino-ether hydrochloride of para-methyl-phenylacetic acid, which is obtained from 6.55 grams of 4-methyl-benzyl cyanide and 2.9 ml. of absolute alcohol in 50 ml. of chloroform by introducing dry hydrochloric acid gas at −10° C., allowing the mixture to stand for 16 hours at 25° C. and evaporating under reduced pressure. The whole is then stirred for 20 hours at 40–45° C. The reaction mixture is evaporated under reduced pressure, the residue is taken up in aqueous hydrochloric acid, the acid solution is washed with chloroform and rendered alkaline with ammonia solution and extracted with chloroform. The chloroform extract is washed with sodium carbonate solution and dried with magnesium sulfate and evaporated. The so-obtained crude 1-(β-diethylaminoethyl)-2-(para-methyl-benzyl)-5-nitro-benzimidazole can be converted into its colourless, crystalline hydrochloride melting at 216° C. by dissolving in ethanol and adding the calculated quantity of ethanolic hydrochloric acid.

EXAMPLE 10

7.2 grams of 2-(β-diethylamino-ethylamino)-5-nitro-aniline hydrochloride in 90 ml. of glacial acetic acid are added at room temperature to the imino-ether hydrochloride of para-ethoxy-phenylacetic acid, which is prepared from 8.05 grams of para-ethoxy-benzyl cyanide and 2.9 ml. of absolute alcohol in 50 ml. of chloroform by introducing dry hydrochloric acid gas at −10° C. allowing the mixture to stand at 25° C. for 16 hours and evaporating under reduced pressure. The whole is then stirred for 20 hours at 40–45° C. The reaction mixture is evaporated under reduced pressure, the residue is taken up in aqueous hydrochloric acid, the acid solution washed with chloroform, rendered alkaline with ammonia solution and extracted with chloroform. The chloroform extract is washed with sodium carbonate solution and dried with magnesium sulfate and evaporated. The so-obtained crude 1-(β-diethylamino-ethyl)-2-(para-ethoxy-benzyl)-5-nitro-benzimidazole can be converted into its colourless crystalline hydrochloride with double melting point 105–107° C./162–163° C. by dissolving in ethanol and adding an equivalent of ethanolic hydrochloric acid.

In an analogous manner there can be prepared 1-(β-diethylamino-ethyl) - 2 - (para-tertiary butyl-benzyl)-5-nitro-benzimidazole hydrochloride melting at 208–210° C., 1 - (β-diethylamino-ethyl)-2-(para-fluoro-benzyl)-5-nitro-benzimidazole methane sulfonate melting at 165–167° C. and 1-(β-diethylamino-ethyl)-2-(para-hydroxy-benzyl)-5-nitrobenzimidazole melting at 188–190° C., and its hydrochloride melting at 246–248° C.

EXAMPLE 11

7.2 grams of 2-(β-diethylamino-ethyl-amino)-5-nitro-aniline hydrochloride in 90 ml. of glacial acetic acid are added at room temperature to the imino-ether-hydrochloride of ortho-chloro-phenylacetic acid, which is obtained from 7.6 grams of ortho-chlorobenzyl cyanide and 2.9 ml. of absolute alcohol in 50 ml. of chloroform by introducing dry hydrochloride acid gas at −10° C., allowing the whole to stand at 25° C. for 16 hours and evaporating under reduced pressure. The whole is then stirred for 20 hours at 40–45° C. The reaction mixture is evaporated under reduced pressure, the residue is dissolved in aqueous hydrochloric acid, the acid solution washed with chloroform and rendered alkaline with ammonia solution, and extracted with chloroform. The chloroform extract is washed with sodium carbonate solution, dried with magnesium sulfate and evaporated. When crystallized from a mixture of acetone and ether there is obtained 1 - (β-diethylamino-ethyl)-2-(ortho-chlorobenzyl)-5-nitro-benzimidazole melting at 104–107° C. By dissolving the product in ethanol and adding an equivalent of ethanolic hydrochloric acid the hydrochloride is obtained which melts at 200–203° C.

In an exactly analogous manner there can be prepared 1 - (β - diethylamino - ethyl) - 2 - (2':4'-dichlorobenzyl)- 5-nitro-benzimidazole melting at 105–107° C., its hydrochloride melting at 198–199° C., 1-(β-diethylamino-ethyl) - 2 - (ortho - methylbenzyl) - 5 - nitro-benzimidazole hydrochloride melting at 198–199° C., 1-(β-diethylamino-ethyl) - 2 - (2':5' - dimethyl - benzyl) - 5 - nitro-benzimidazole hydrochloride melting at 210–212° C., 1 - (β - piperidino-ethyl) - 2 - (para-chlorobenzyl)-5-nitro benzimidazole melting at 109–110° C., its hydrochloride melting at 230–232° C., 1-(β-morpholino-ethyl)-2-(para-chlorobenzyl) - 5 - nitro-benzimidazole melting at 146–148° C., its hydrochloride melting at 249–250° C., 1 - [β - (4'-methyl-piperazino)-ethyl] - 2 - (para-chlorobenzyl) - 5 - nitro-benzimidazole melting at 134–135° C., its hydrochloride melting at 183–187° C., 1-(β-dimethylamino-ethyl)-2 - (para-chlorobenzyl) - 5 - nitrobenzimidazole hydrochloride melting at 230–232° C., 1 - (γ-diethylamino - propyl) - 2 - (para - methoxy - benzyl)-5-nitrobenzimidazole hydrochloride melting at 117–118° C./180–182° C., 1 - (β - diethylamino-ethyl) - 2 - (para-nitrobenzyl) - 5 - nitrobenzimidazole melting at 110–112° C., its hydrochloride melting at 175° C.

The starting materials can be prepared as follows:

(a) *1-methyl-4-(β-amino-ethyl)-piperazine*

38.6 grams of methyl-di(β-chloroethyl)-amine hydrochloride are stirred in 300 ml. of absolute alcohol and 60 grams of dry ethylene diamine for 16 hours under reflux. The whole is then cooled and a sodium alcoholate solution, prepared for 14 grams of sodium and 250 ml. of absolute alcohol, is added. The precipitated sodium chloride is filtered off and after evaporation the residue is subjected to fractional distillation. The fraction boiling at 81–83° C. under 11 mm. pressure of mercury consists of 1-methyl-4-(β-amino-ethyl)-piperazine.

(b) *N -[ β - (4-methyl - piperazino) - ethyl] - 2:4 - dinitro-aniline*

60.7 grams of 2:4-dinitrochlorobenzene and 50 grams of 1-methyl-4(β-aminoethyl)-piperazine are boiled under reflux in 0.4 liter of alcohol for 4 hours. The mixture is then rendered strongly alkaline with aqueous ammonia, and the precipitated N-[β-(4-methyl-piperazino)-ethyl]-2:4-dinitro-aniline melting at 120–121° C. is suction-filtered.

In an analogous manner N-(β-dimethyl-amino-ethyl)-2:4-dinitro-aniline hydrochloride melting at 224–225° C., N-(β-piperidino-ethyl) - 2:4-dinitro - aniline melting at 103–105° C., N-(β-morpholino-ethyl)-2:4-dinitro-aniline melting at 111–112° C. and N-(γ-diethylamino-propyl)-2:4-dinitro-aniline melting at 170–175° C. can be prepared.

(c) *2-β-(4'-methyl-piperazino)-ethylamino-5-nitro-aniline*

60 grams of N-[β-(4-methyl-piperazino)-ethyl]-2:4-dinitro-aniline are dissolved in 400 ml. of alcohol and 107 cc. of concentrated aqueous ammonia, and H₂S is introduced until the solution is saturated. The alcohol is distilled off, the residue is taken up in 5 N-hydrochloric acid, filtered off from the precipitated sulfur, the filtrate is rendered alkaline again with ammonia solution and extracted with benzene. The benzene solution, dried with magnesium sulfate and concentrated, yields 2-β-(4'-methyl-piperazino)-ethylamino-5-nitro-aniline in the form of red crystals melting at 148–151° C.; its monochloride melts at 180–185° C.

In an analogous manner 2-(β-dimethylamino-ethylamino)-5-nitro-aniline hydrochloride melting at 222–223° C., 2-(β-piperidino-ethylamino)-5-nitro-aniline melting at 106–108° C. and its hydrochloride which melts at 220–222° C., 2-(β-morpholino - ethylamino)-5-nitro - aniline melting at 144–145° C., and its hydrochloride which melts at 225–227° C., and 2-(γ-diethylamino-propylamino) - 5 - nitro - aniline hydrochloride melting at 199–200° C. can be prepared.

EXAMPLE 12

3.68 grams of 1-(β-diethylamino - ethyl) - 2 - para-hydroxy-benzyl)-5-nitro-benzimidazole are dissolved in 50 ml. of 2 N—NaOH, and 12 grams of dimethyl sulfate are added dropwise at 40° C. with stirring. After 15 minutes the mixture is extracted with benzene, the benzene solution is washed with dilute caustic soda solution and extracted with 1 N-hydrochloric acid, the acid solution is rendered alkaline again with concentrated ammonia and extracted with ether. The ether extract is dried with $MgSO_4$ and, after evaporation, yields 1(-β-diethylamino-ethyl)-2-(para - methoxy - benzyl)-5-nitro - benzimidazole which in alcoholic solution is converted into its hydrochloride melting at 197–198° C. by the addition of an equivalent of alcoholic hydrochloric acid.

In an analogous manner the following compounds can be prepared:

1 - (β - diethylamino - ethyl) - 2 - [para - (O - methyl-nona - ethylene glycol - hydroxy) - benzyl] - 5 - nitro-benzimidazole;
  Viscous, faintly yellow coloured water-soluble oil
    Turbidity point of the 10% aqueous solution 46.5° C.
    Maxima in the ultra violet spectrum: 242 m$\mu$ $\epsilon$= 27,200 and 310 m$\mu$ $\epsilon$=9600.

1 - (β - diethylamino - ethyl) - 2 -[para - (O -methyl-triethylene glycol - hydroxy) - benzyl] - 5 - nitro - benzimidazole;
  Viscous, faintly yellow coloured oil
    Maxima in the ultra violet spectrum: 242 m$\mu$ $\epsilon$= 27,400 and 310 m$\mu$ $\epsilon$=9500.

1 - (β - diethylamino - ethyl) - 2 - [para - (ethoxy-ethylene - hydroxy) - benzyl] - 5 - nitro - benzimidazole;
  Pale yellow coloured oil.
    Its hydrochloride melts at 150–153° C.

EXAMPLE 13

3.7 grams of 1 - (β - diethylamino-ethyl)-2-(para-hydroxy-benzyl)-5-nitro-benzimidazole are dissolved in 10 ml. of pyridine and 1.3 ml. of acetic anhydride. The reaction mixture is heated for 30 minutes at 80° C. and allowed to stand for 3 hours at room temperature, after which the pyridine is removed in vacuo. 10 ml. of saturated sodium bicarbonate solution are added to the residue and it is then extracted with ether, dried with magnesium sulfate and evaporated. The residue is crystallized from a mixture of ether and petroleum ether. The free base melts at 74–76° C.; the hydrochloride obtained from alcohol with an equivalent of hydrochloric acid melts at 195–196° C.

EXAMPLE 14

4 grams of 1-(β-diethylaminoethyl)-2-(para-nitro-benzyl)-5-nitrobenzimidazole are dissolved in 50 ml. of warm alcohol, to the solution are added 16 ml. of concentrated aqueous ammonia, and the reaction mixture is saturated with hydrogen sulfide for 4 hours with stirring, and the alcohol is then removed in vacuo. The residue is taken up in 100 ml. of 1 N-hydrochloric acid, the aqueous solution is treated with animal charcoal and liberated from sulfur and Norit by filtration over Hyflo. The clear solution is rendered alkaline with ammonia and extracted with chloroform, the chloroform extract is dried and evaporated. The residue is recrystallized from alcohol and ether and pure 1-(β-diethylamino-ethyl)-2-(para-amino-benzyl)-5-nitro-benzimidazole melting at 110–115° C. is obtained.

EXAMPLE 15

TABLET 1 tablet contains: | Mg.
---|---
1 - (β - diethylamino-ethyl) - 2 - (para - chlorobenzyl)-5-nitro-benzimidazole-methane sulfonate (product 19,390) | 25.0
Lactose | 70.0
Wheat starch | 20.0
Aerosil comp | 10.0
Arrowroot | 15.0
Magnesium stearate | 1.0
Talc | 9.0
| 150.0

PREPARATION

Product 19,390 is mixed with lactose and ground for 14 hours in a ball mill. The mixture is passed through a sieve having a mesh of 0.25 mm. Aerosil compositum is worked up to a paste-like mass with de-ionised water. The powder mixture is then processed with the Aerosil paste in a mixing and kneading machine, and wheat starch is added in portions. The evenly moistened, slightly plastic mass is granulated through a sieve having a mesh of about 3 mm., dried at about 50° C. and sieved through a sieve having a mesh of 1.5 mm. The other ingredients are then added and the mixture tabletted.

EXAMPLE 16

SOLUTION FOR INJECTIONS 1 ampoule contains:
  Product 19,390 _____gram__ 0.020
  Glucose _____do___ 0.084
  Distilled water to make up _____ml__ 2.0

PREPARATION

Product 19,390 and glucose are dissolved in sufficient distilled water to bring the concentration of the solution up to 10 mg. of product 19,390 for 1 ml. of solution. The solution homogenised by stirring is filtered in the usual manner and filled into ampoules of 2 ml. useful content and sealed. The sealed ampoules are sterilized for 30 minutes in steam under pressure at 120° C. pH=4.35.

EXAMPLE 17

4.3 g. of 2-(β-diethylamino-ethylamino)-5-nitro-aniline-hydrochloride in 60 ml. of glacial acetic acid are added at room temperature to the iminoether-hydrochloride of p-butoxyphenyl-acetic acid obtained from 5.66 g. of p-butoxy-benzyl cyanide and 1.75 ml. of absolute ethanol in 50 ml. of chloroform by introducing dry hydrogen chloride gas at −10° C., allowing the reaction mass to stand for 16 hours at 25° C. and evaporating it under reduced pressure. The mixture is then stirred at 40–45° C. for 20 hours. The reaction mixture is evaporated under reduced pressure, the residue taken up in aqueous hydrochloric acid, the acid solution washed with chloroform and rendered alkaline with ammonia solution, extracted with chloroform, the chloroformic extract washed with sodium carbonate solution, dried with magnesium sulfate, and evaporated. The resulting crude 1-(β-diethylamino-ethyl)-2-(p-butoxy-benzyl)-5-nitro-benzimidazole can be converted into the colorless crystalline hydrochloride of melting point 150–152° C. by dissolving it in ethanol and adding the calculated quantity of ethanolic hydrochloric acid.

The 1-(β-diethylaminoethyl)-2-(p-propyloxy-benzyl)-5-nitro-benzimidazole-hydrochloride of melting point 115–116° C. and the 1-(β-diethylaminoethyl)-2-(p-isopropyloxy-benzyl)-5-nitro-benzimidazole-hydrochloride of melting point 172–173° C. can be prepared in an analogous manner.

The p-butoxy-benzylcyanide required as starting material can be prepared as follows:

37 g. of butyl iodide and 20 ml. of 10N—NaOH are added dropwise simultaneously to 13.3 g. of p-hydroxy-benzylcyanide in 100 ml. of alcohol with stirring. After being refluxed for 16 hours, the reaction mass is evaporated under reduced pressure, the residue taken up in ether and water, the ethereal solution washed with caustic soda solution, dried over $MgSO_4$ and evaporated, and the resulting p-butoxy-benzylcyanide distilled at 100–110° C. under a pressure of 0.18 mm. of mercury.

The p-propyloxybenzylcyanide and the p-isopropyl-benzylcyanide prepared in similar manner both distill at 100° C. under a pressure of 0.2 mm. of mercury.

What is claimed is:

1. A member selected from the group consisting of a 2-benzyl-5-nitro-benzimidazole of the formula:

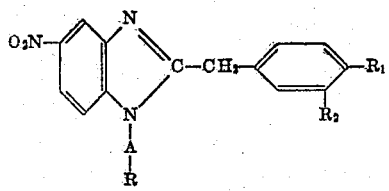

wherein A represents a lower alkylene radical, R represents a member selected from the group consisting of di-lower alkylamino, pyrrolidino, piperidino, morpholino and piperazino, and $R_1$ and $R_2$ each represents a member selected from the group consisting of hydrogen, halogen, lower alkyl and lower alkoxy, and non-toxic acid addition salts thereof.

2. A benzimidazole of the formula:

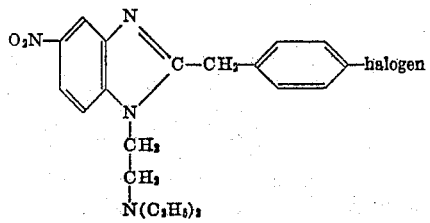

3. A benzimidazole of the formula:

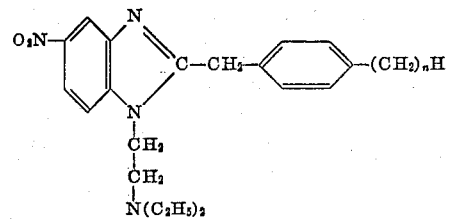

wherein $n$ is an integer from 0 to 7 both inclusive.

4. A benzimidazole of the formula:

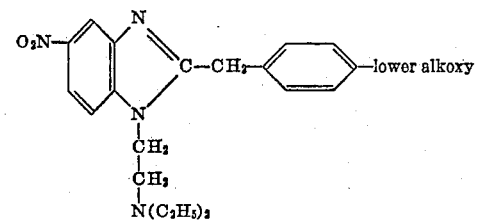

5. 1-($\beta$-diethylamino-ethyl)-2-benzyl-5-nitro - benzimidazole.
6. 1-($\beta$-diethylamino-ethyl)-2-(para-chlorobenzyl) - 5-nitro-benzimidazole.
7. 1-($\beta$-diethylamino-ethyl)-2-(para-methyl - benzyl)-5-nitro-benzimidazole.
8. 1-($\beta$-diethylamino-ethyl)-2-(para - tertiary butyl-benzyl)-5-nitro-benzimidazole.
9. 1-($\beta$-diethylamino-ethyl)-2-(meta-methoxy-benzyl)-5-nitro-benzimidazole.
10. 1-($\beta$-diethylamino-ethyl)-2-(para-ethoxy - benzyl)-5-nitro-benzimidazole.
11. Non-toxic acid addition salts of the compound of claim 10.
12. Non-toxic acid addition salts of the compounds of claim 9.

References Cited in the file of this patent

Novelli: Chem. Abst., vol. 49, col. 1021g (1955).
McKee: Jour. Amer. Chem. Soc., vol. 68, pp. 1904–5 (1946).
Efros: Chem. Abst., vol. 47, col. 12366f (1953).
Martinelli: Chem. Abst., vol. 47, col. 4230h (1953).